United States Patent [19]

Bantien

[11] Patent Number: 5,148,604
[45] Date of Patent: Sep. 22, 1992

[54] MICROMECHANICAL TILT SENSOR

[75] Inventor: Frank Bantien, Ditzingen, Fed. Rep. of Germany

[73] Assignee: Robert Bosch GmbH, Stuttgart, Fed. Rep. of Germany

[21] Appl. No.: 701,781

[22] Filed: May 17, 1991

[30] Foreign Application Priority Data

May 22, 1990 [DE] Fed. Rep. of Germany ....... 4016471

[51] Int. Cl.$^5$ .............................................. G01C 9/06
[52] U.S. Cl. ......................................... 33/366; 33/391
[58] Field of Search ................................ 33/366, 391

[56] References Cited

U.S. PATENT DOCUMENTS 4,549,926 10/1985 Corboy .
4,578,142 3/1986 Corboy .
4,585,513 4/1986 Gale .
4,658,495 4/1987 Flatley .
4,698,132 10/1987 Dennis .
4,955,234 9/1990 Marek .

FOREIGN PATENT DOCUMENTS 3625411 2/1988 Fed. Rep. of Germany .
3927163 4/1990 Fed. Rep. of Germany .

OTHER PUBLICATIONS

Walter Kern, "Chemical Etching of Silicon, Germanium, Gallium Arsenide, and Gallium Phosphide", RCA Review, Jun. 1978, vol. 39, pp. 278-308.

Primary Examiner—Harry N. Haroian
Attorney, Agent, or Firm—Frishauf, Holtz, Goodman & Woodward

[57] ABSTRACT

A sensor for measurement of tilt or inclination angle features a sensor element made from a monocrystalline silicon wafer, from which is etched at least one movable silicon mass. The silicon mass is freed from the surrounding wafer by an etch groove which completely penetrates the silicon wafer, and is connected to the silicon wafer by two bars lying in a common axis, so that, upon flexing or torsioning of the bars, the silicon mass is movable or rotatable about the axis of the bars. The sensor element is connected with an upper and/or a lower cover. On at least one of the covers, adjacent the silicon mass, at least two electrodes are placed. The silicon mass and the two electrodes form a pair of capacitances, and the movement or excursion of the silicon mass is detected by evaluation of the difference between the capacitances.

17 Claims, 4 Drawing Sheets

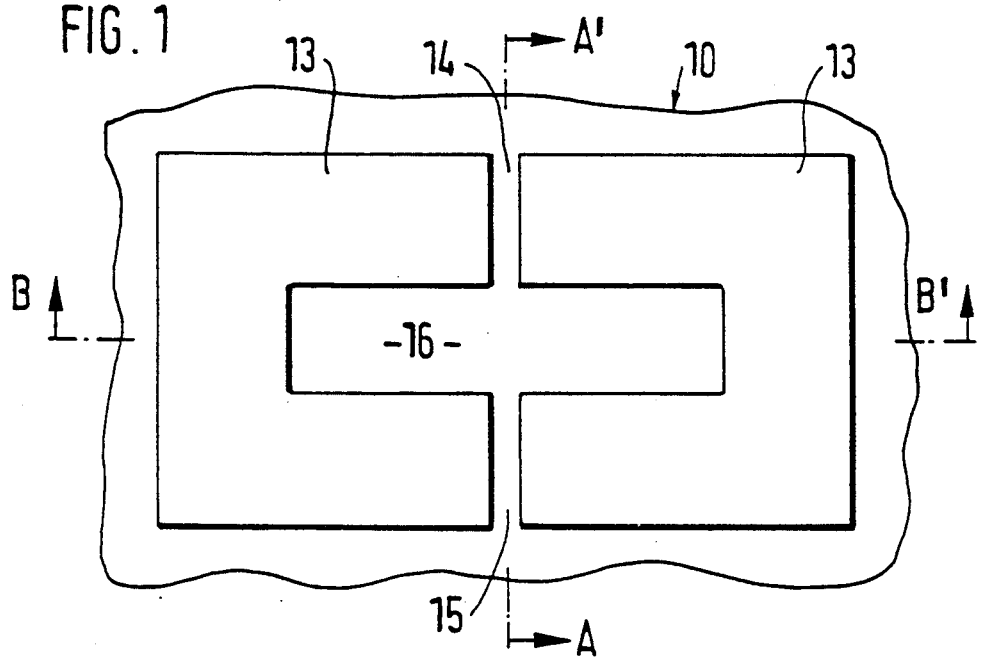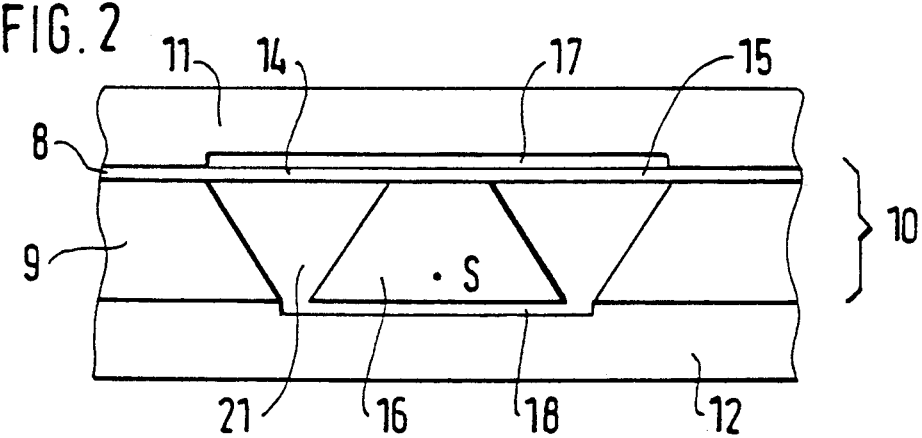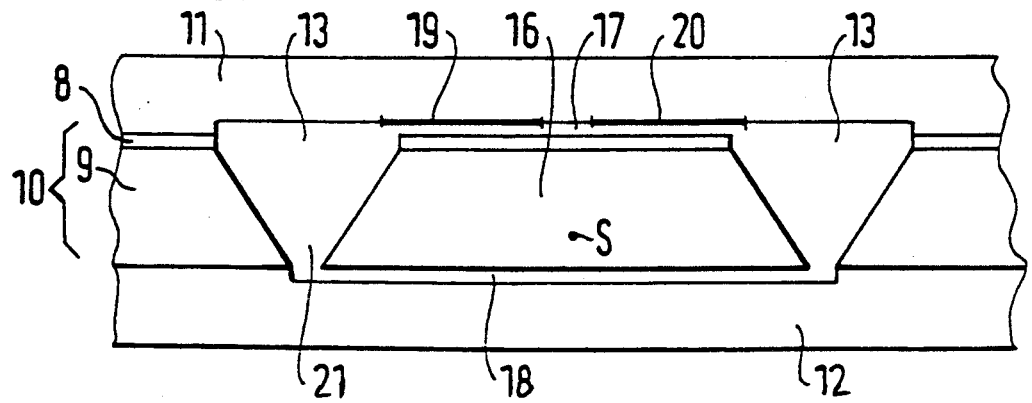

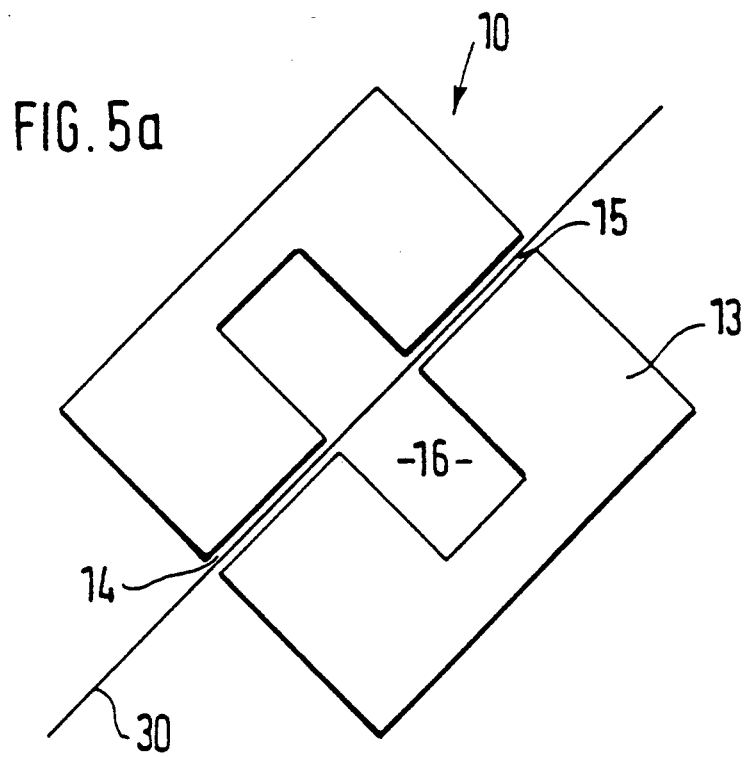
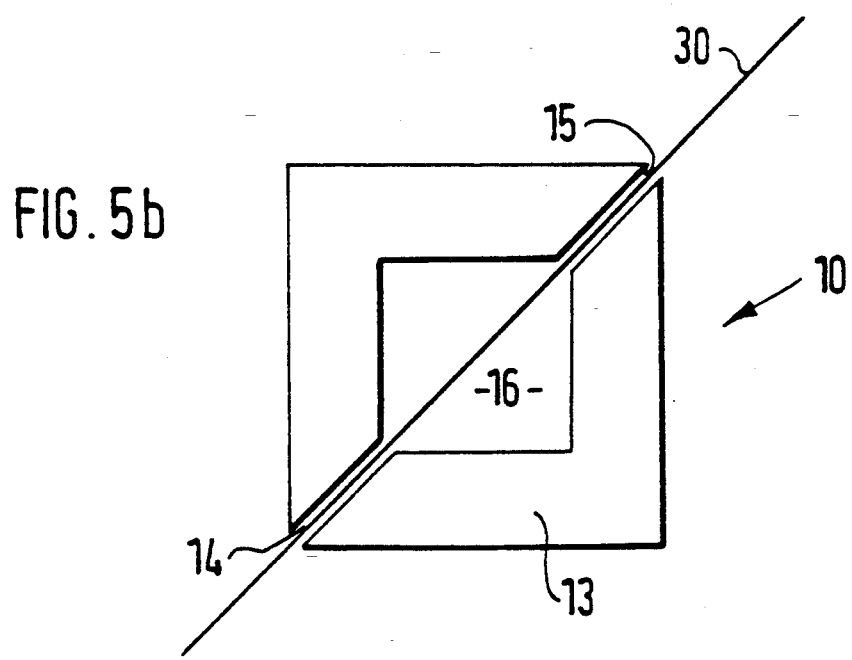

MICROMECHANICAL TILT SENSOR

CROSS-REFERENCE TO RELATED PATENT AND APPLICATIONS, ASSIGNED TO THE ASSIGNEE OF THE PRESENT INVENTION, THE DISCLOSURES OF WHICH ARE HEREBY INCORPORATED BY REFERENCE

RCA Review, Vol. 39, June 1978, pp. 278-308.

German Patent Disclosure DE 36 09 841, filed Mar. 22, 1986, and Published International application WO 87/05569, HEINTZ et al;

U.S. Pat. No. 4,955,234, MAREK, issued Sep. 11, 1990=DE 38 14 952;

German Patent Disclosure DE 39 27 163 and corresponding International application PCT/DE90/00596, U.S. Ser. No. 07/631,623, MAREK, BANTIEN, HAACK & WARTH, corresponding to German Patent DE-PS 40 00 903 of Aug. 9 1990, German Patent Disclosure DE 40 16 472.1, filed May 22, 1990, and corresponding U.S. Ser. No. 07/701,880, BANTIEN & FINDLER, German Patent Disclosure DE 40 22 464.3, filed Jul. 14, 1990, and corresponding U.S. Ser. No. 07/716,817, MAREK.

CROSS-REFERENCE TO OTHER RELATED PATENT

German Patent DE-PS 36 25 411, SEIDEL, Nov. 11, 1988, assigned to Messerschmidt-Bolkow-Blohm GmbH.

FIELD OF THE INVENTION

The present invention relates generally to inclination or tilt sensors for measuring acceleration and, more particularly, to such a sensor which is fabricated of silicon rather than using liquid mercury, a toxic material.

BACKGROUND

Today, in motor vehicle systems, the function of inclination or tilt sensing is generally carried out using mercury switches. A ball of mercury is displaced from its rest position, under the influence of static gravitational acceleration, according to the inclination angle of the sensor. Upon passage beyond a defined angle, this displacement causes interruption of an electrical contact. For reasons of toxicity, the use of these mercury switches will be increasingly restricted in the years to come.

U.S. Pat. No. 4,955,234, MAREK/BOSCH, and corresponding German application P 38 14 952, disclose a micromechanical silicon acceleration sensor in which a pendulum, supported on one or more bending bars, is displaced from its rest position by a force acting perpendicular to the chip surface. The displacement is determined piezo-resistively by the bending of the bars. These sensors are advantageously employed as acceleration sensors.

German Patent DE-PS 36 25 411, SEIDEL, Nov. 11, 1988, assigned to the Messerschmidt-Bolkow-Blohm GmbH aerospace company, discloses a micromechanical acceleration sensor with capacitive signal pickup. With the aid of two fixed-position counterelectrodes, the displacement of a silicon mass, supported on multiple bars and serving as the middle electrode of a differential capacitor, is detected.

From German application P 39 27 163 and corresponding PCT/DE90/00596, it is known to etch out further structures from semiconductor wafers.

THE INVENTION

The sensor of the present invention its solid-state movable seismic mass, has the advantage, over the mercury-based prior art, that no health-endangering materials are used. A further advantage is that the sensor element can be simply made by conventional micromechanical fabrication methods and known ways of making semiconductor components. The seismic mass needed for tilt-dependent acceleration measurement can be easily obtained by using the entire wafer thickness, once the silicon mass has been defined by etching. The capacitive detection of displacement of the silicon mass is particularly advantageous since signal evaluation in the form of differential capacitance permits amplification of the signal and eliminates the influence of noise derived from cross-acceleration.

In addition, the present invention offers other helpful features. The encapsulation of the sensor element, in order to set a defined pressure within the sensor element, permits optimal damping of the silicon mass. Encapsulation also inhibits dirt accumulation or soiling of the sensor element.

In order to assure the mobility of the silicon mass, one preferably uses covers, which have a cavity or recess adjacent the silicon mass and its supporting torsion bars. It is advantageous to reduce the aggregate thickness of the movable silicon structures and thus to assure their mobility. It is also preferred to make the electrodes in the form of a structured metal layer on the cover. If one or both covers are structured, it is advantageous to arrange the electrodes, formed by the structured metal layer, on the floor of a cavity adjacent the silicon mass. It has been found particularly desirable to select, as the material for the covers, either PYREX glass or silicon, and to bond the covers anodically against the sensor element.

The silicon mass is preferably etched out of a silicon wafer with (100) or (110) crystal orientation since, in wafers of these crystal orientations, one can particularly easily etch structures using electrochemical anisotropic etching, in which structures the center of gravity/mass of the silicon mass lies as far as possible from the bar axis, so that the sensitivity of the sensor is as great as possible.

In the case of silicon wafers with (100) crystal orientation, it is preferred that the position of the bar axis is chosen to be in the (100) direction within the silicon wafer, since during the manufacture of the sensor element, the anisotropic characteristics of the etching process can be used for under-etching of the bars.

It is preferred in making the sensor element to use silicon wafers which have an n- or p-doped substrate and a differently doped epitaxial layer formed thereon. The significant feature is the doping transition between substrate and epitaxial layer. The doping transition can, however, also be created by diffusion. It is preferred to have an np+ transition and a pp+ transition, since the etch-stop boundary for electro-chemical etching processes can be used.

Due to the etch-stop characteristics of the epitaxial layer, the torsion bars may advantageously be formed in the epitaxial layer. A particularly advantageous form for the sensor is to arrange the electrodes adjacent the underside of the silicon mass. The electrical contacting of the silicon mass (serving as a capacitor plate) from the wafer front face can then be made possible by a corresponding doping of the substrate (forming the silicon mass) and/or the epitaxial layer in the area of the silicon mass and/or of the bars. A particular advantage of the sensor structure of the present invention is that, by combination of two sensors, one can easily create sensors which measure the tilt angles in multiple directions.

Further, the manufacture of the sensor, from silicon wafers having a doping transition between a substrate and an epitaxial layer formed thereon, involves only process steps which are conventional in semiconductor technology.

In this connection, it is advantageous that the sensor element can be made using electrochemical etching, both by back-side etching and by front-side etching of the silicon wafer, using the epitaxial layer as an etch-stop layer.

DRAWINGS

FIG. 1 is a plan view of the sensor element of the sensor of the present invention;

FIG. 2 is a cross-section along plane A—A of the sensor of FIG. 1;

FIG. 3 is a cross-section along plane B—B of the sensor of FIG. 1;

FIGS. 5a and 5b are plan views of alternative embodiments of the sensor;

DETAILED DESCRIPTION

Figure 4A:
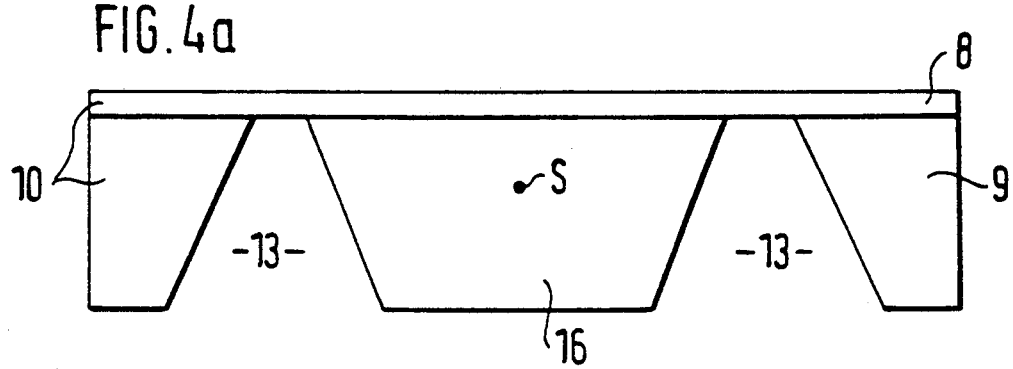
FIGS. 4a–4c are cross-sections through alternative embodiments of the sensor.

In FIG. 1, reference numeral 10 designates a monocrystalline silicon wafer, out of which the structure of the sensor element is etched. The silicon wafer in this example has a (100) crystal orientation, but could also have another orientation, for example (110). By means of an etched cavity 13, there is defined a structure consisting of a silicon mass 16 and two supporting bars 14 and 15. Bars 14 and 15 serve as supports for the silicon mass 16, and are aligned along a single common axis, so that axial twisting or torsioning of bars 14 and 15 permits displacement of silicon mass 16 perpendicular to the chip surface. It is also possible to substitute, for bar pair 14, 15, multiple bars or an alternative hanging means. In any case, one must ensure that silicon mass 16 can be displaced, upon twisting or flexing of the hanging means.

In this preferred embodiment, silicon wafer 10 comprises an n- or p-doped substrate 9 and an epitaxial layer 8 formed on it. Layer 8 has a different doping, so that a doping transition plane arises between layer 8 and substrate 9. This can be a pn-transition, an np+ transition, or a pp+ transition.

FIG. 2 illustrates a further, upper cover 11, which is formed with a cavity 17 adjacent silicon mass 16 and bars 14,15. This prevents upper cover 11 from interfering with the mobility or displacement of silicon mass 16. The sensor element is located on top of a lower cover 12, which similarly is formed with a cavity 18 adjacent silicon mass 16, in order for lower cover 12 not to interfere with displacement of silicon mass 16. Alternatively, one could reduce the thickness of silicon mass 16 at its upper and lower faces. Both lower cover 12 and upper cover 11 consist of glass or silicon, and serve to encapsulate the sensor element. In the sensor interior space 21, a specific pressure is set, so that the oscillation of silicon mass 16 is optimally damped.

The formation of silicon mass 16 is accomplished by anisotropic wet chemical etching. In silicon wafers with (100) crystal orientation, structures with trapezoidal cross-section are created, and in silicon wafers with (110) crystal orientation, structures with rectangular cross-section are created. Silicon wafer 16 extends through the entire thickness of silicon wafer 10. Bars 14 and 15 are formed by electrochemical under-etching. The doping transition between substrate 9 and epitaxial layer 8 serves as the etch stop. During the etching process, a pn-transition is connected in blocking direction. The etching rate drops off sharply once a space charge zone is reached, due to the changed electrochemical potentials at the crystal surface. This effect occurs also at an np+ transition or at a pp+ transition, although here the application of a voltage is not necessary. Consequently, the bars 14 and 15 are formed solely in the epitaxial layer. In order to achieve optimal displacement of silicon mass 16, one typically selects for bars 14, 15 dimensions of 2 mm by 20 micrometers by 20 micrometers. In order to make the sensor as sensitive as possible, the center of mass S of silicon mass 16 must be as far as possible from the bar axis, so that the torque, associated with rotation of the sensor about the bar axis, which displaces the mass from its rest position, is as large as possible.

FIG. 3 illustrates two electrodes 19, 20 formed on the floor of cavity 17. Together with silicon mass 16, they define a capacitance. Electrodes 19, 20 can, for example, be carried out as a structured metal layer on upper cover 11. Upon twisting of bars 14, 15 and displacement of silicon mass 16, there are counter-varying changes in the respective spacings between silicon mass 16 and electrode 19, and between silicon mass 16 and electrode 20. For example, an increase of the spacing between silicon mass 16 and electrode 19 necessarily means a decrease in the spacing between silicon mass 16 and electrode 20, and vice versa. The changes in the spacings correspondingly alter the capacitances. If the evaluation of the displacement of the silicon mass 16 is accomplished by measuring the difference of the capacitance between silicon mass 16 and electrode 19, on one hand, and the capacitance between silicon mass 16 and electrode 20, on the other hand, a signal resulting from tilt of the sensor is amplified. Signals arising from, for example, acceleration perpendicular to the sensor surface are not registered by an evaluation circuit based on difference formation since, in that case, both capacitances vary in the same direction.

Figure 4B:
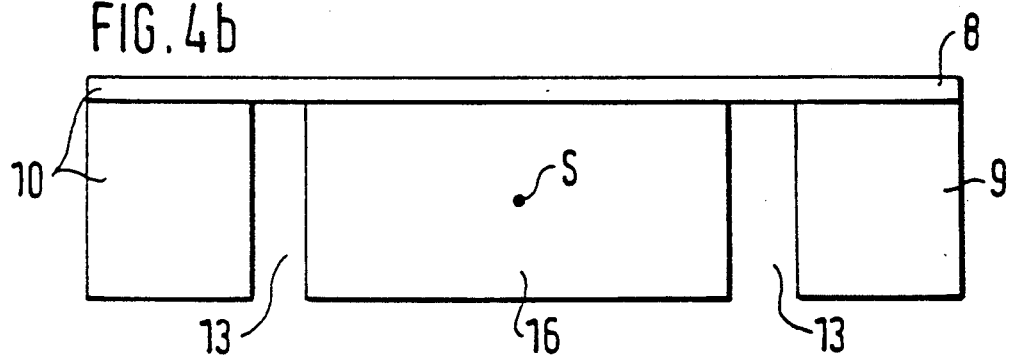

FIGS. 4a and 4b illustrate sensor elements whose structure is defined by back-side etching of a silicon wafer 10 having an n- or p-doped substrate and, placed thereon, an epitaxial layer of a different doping than the substrate, so that a doping transition takes place between substrate and epitaxial layer. FIG. 4a illustrates a sensor element on a silicon wafer 10 with (100) crystal orientation. Upon electrochemical anisotropic etching of the back side, V-shaped etch grooves 13 form. FIG. 4b illustrates a sensor element on a silicon wafer 10 with (110) crystal orientation. Upon electrochemical anisotropic etching of the back side, etch grooves 13 with right-angled walls form. A final etching process from the wafer front side then defines the sensor structure.

Figure 4C:
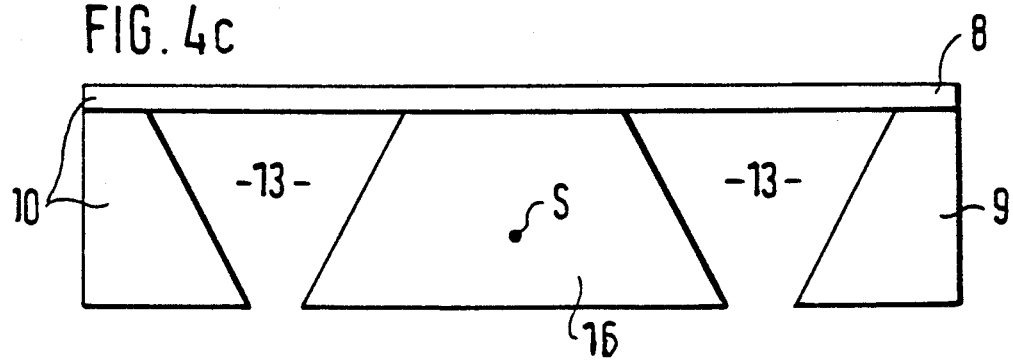

FIG. 4c illustrates a sensor element in a two-layer silicon wafer 10 with (100) crystal orientation. In contrast to the sensor element shown in FIG. 4a, the structuring here is carried out from the front side of silicon wafer 10.

In both manufacturing methods, the main or primary sides of the silicon wafers are passivated using masking conventional in micromechanical technology. In each case, S designates the silicon mass 16's center of gravity. The location of this silicon mass center S can be differently selected, depending upon the crystal orientation of silicon wafer 10, and the process steps used in the manufacture of the sensor elements. In this manner, the sensitivity of the sensor can be varied.

Further embodiments of a sensor element, which can be made without back-side etching, are shown in plan view FIGS. 5a and 5b. Here silicon masses 16 are etched from silicon wafers having (100) crystal orientation and a doping transition between substrate and epitaxial layer. Bars 14 and 15 are formed within the epitaxial layer and oriented in one of the (100) directions. Initially, the epitaxial layer, acting as an etch-stop layer, is structured in the groove region by a first etching step. Subsequently, silicon wafer 10 is structured from the front side by electrochemical anisotropic etching. Here, bars 14 and 15 are defined or released by underetching under the epitaxial layer. In the underetching of the bars, one must take care that the convex corners formed under the bars are not prematurely attacked. It is therefore preferred, in designing the etch masks, to provide the convex corners of the structure with suitable corner compensation and/or to dimension the bars very broadly. In this, the lateral etch rate in (100) direction is useful. Only shortly before the end of the depth etching must the epitaxial layer be passivated, e.g. by application of a voltage in blocking direction.

If the epitaxial layer and the substrate are electrically insulated from one another by the doping transition, for example by an np-transition, one cannot use the entire silicon mass as middle electrode of a differential capacitor, since the middle or center electrode can only be reached via the bars. This problem does not arise when the doping transition between the substrate and the epitaxial layer is a pp+ transition.

Figure 6:
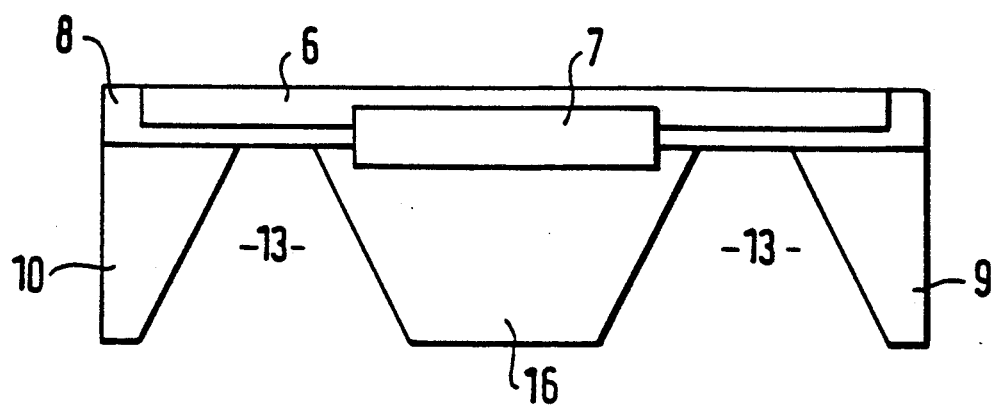
FIG. 6 is a further sectional view through a sensor element.

A further embodiment of the sensor element, in which the entire silicon mass 16 serves as a movable electrode of a differential capacitor, is illustrated in FIG. 6. The silicon wafer 10, from which the sensor element is etched, comprises a p-doped substrate 9 and an n-doped epitaxial layer 8 formed thereon. In the manufacture of the sensor element, prior to the epitaxy, the p-substrate is provided with a p-doping, preferably boron, in the area of the silicon mass 16. After the epitaxy, the n-epitaxy is doped with boron in the areas of the silicon mass, the bars and the connecting leads or tracks. A subsequent tempering step drives the boron atoms into the epitaxial layer and makes possible the electrical connection of the silicon masses. Such process steps are used in the manufacture of bipolar integrated circuits (IC's) for up-and-down insulation and for basis connection diffusion.

Figure 7:
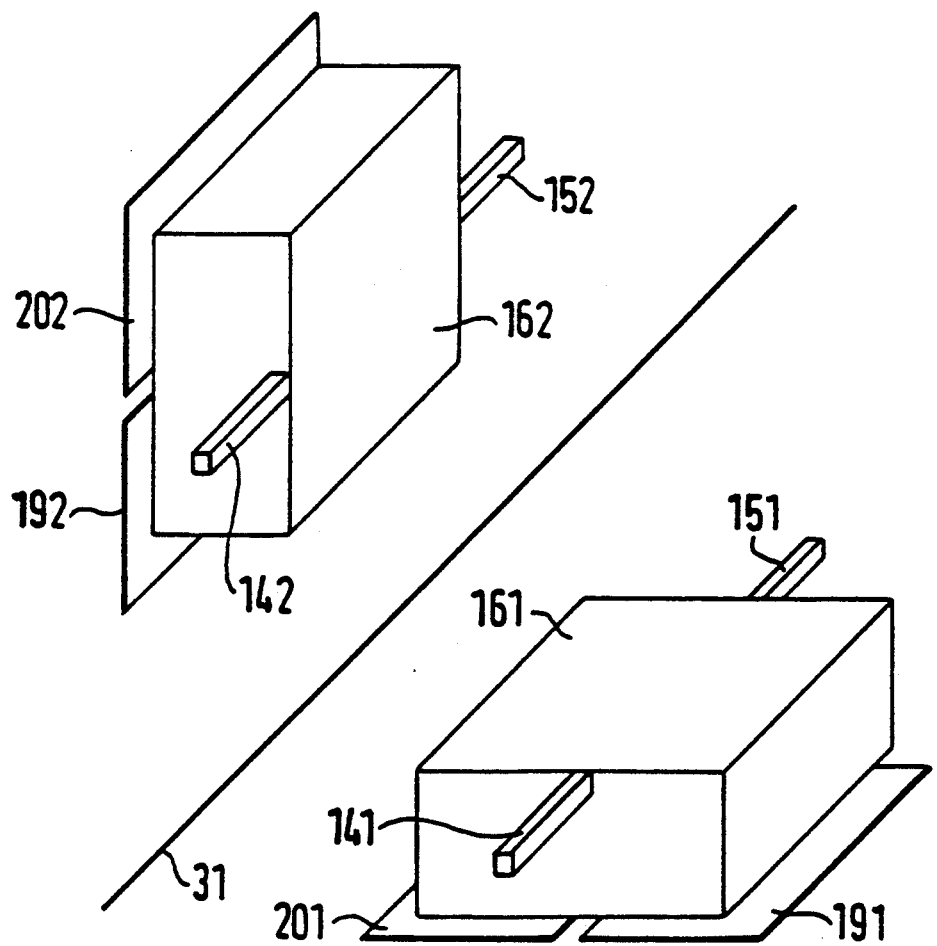
FIG. 7 illustrates the arrangement of two sensor elements within one sensor.

An arrangement of two sensors, as shown in FIG. 7, permits the definite measurement of a rotation angle up to 360° about rotation axis 31. While the first sensor, with electrodes 201 and 191, silicon mass 161 and bars 141 and 151, provides a signal proportional to the sine of the tilt angle, the second sensor, with electrodes 202 and 192, silicon mass 162 and bars 142 and 152, provides a signal proportional to the cosine of the rotation angle. The combination of these signals permits the unambiguous determination of the rotation angle.

An arrangement of two sensors in one plane with torsion axes perpendicular to each other further permits the two-dimensional measurement of a tilt angle.

Various changes and modifications are possible within the scope of the inventive concept. For example, features of one embodiment may be combined with features of another embodiment.

I claim:

1. Sensor for tilt measurement, having a sensor element made from a monocrystalline silicon wafer (10), a movable silicon mass (16) etched out of said wafer (10), and means for evaluation of the displacement of said silicon mass, characterized in that said silicon mass (16) is defined by a surrounding etch groove (13) which completely penetrates silicon wafer (10), said mass (16) being connected to said silicon wafer (10) by two torsion bars aligned along a single axis, said silicon mass (16) is movable by a rotation about the bar axis by twisting of said torsion bars (14, 15), said sensor element is connected to at least one of an upper cover (11) and a lower cover (12), on at least one of said covers (11, 12) at least two electrodes (19,20) are provided in the area of the silicon mass (16), and said silicon mass (16) and two electrodes (19,20) form capacitances whose difference in values is used for evaluation of the movement of the silicon mass.

2. Sensor according to claim 1,
   characterized in that
   at least one of the upper cover (11) and the lower cover (12) is formed with a recess (17, 18) adjacent the silicon mass (16).

3. Sensor according to claim 1,
   characterized in that
   at least one of the movable silicon mass (16) and the rods (14, 15) are reduced in thickness, thereby defining respective spaces from the rods and the silicon masses to their upper cover (11) and to their lower cover (12).

4. Sensor according to claim 1,
   characterized in that
   at least two electrodes (19, 20) are formed from a metallic layer placed on at least one of said upper cover (11) and said lower cover (12).

5. Sensor according to claim 1,
   characterized in that
   said lower cover (12) and said upper cover (11) are of a material selected from the group consisting of silicon and glass.

6. Sensor according to claim 1,
   characterized in that
   said silicon wafer (10) is connected by anodic bonding to at least one of a lower cover (11) and an upper cover (12).

7. Sensor according to claim 1,
   characterized in that
   said silicon wafer (10) has a crystal orientation selected from the group consisting of
   (100) orientation and (110) orientation.

8. Sensor according to claim 1,
   characterized in that
   said silicon wafer (10) is formed of, an n- or p-doped substrate (9) and a differently doped epitaxial etch-stop layer (8), thereby defining a doping transition between said substrate and said etch-stop layer (8).

9. Sensor according to claim 8
characterized in that
the silicon wafer has (100) crystal orientation and
the bar axis is oriented in one of the (100) directions in the wafer surface.

10. Sensor according to claim 8,
characterized in that
said doping transition is a pn-transition and that the silicon mass (16) is in electrical contact with the wafer surface due to at least one of:
a doping of said substrate (9) adjacent the silicon mass (16);
a doping of the epitaxial layer (8) adjacent the silicon mass (16); and
a doping of the epitaxial layer (8) adjacent the bars (14,15).

11. Sensor according to claim 8,
characterized in that
the substrate (9) is etched way in the area of the bars (14, 15).

12. Sensor according to claim 1,
further comprising
at least one further sensor whose bar axis is perpendicular to the bar axis of the first sensor.

13. Sensor according to claim 1,
further comprising
at least one further sensor of the same kind, whose excursion direction is perpendicular to the excursion direction of the first sensor, so that the bar axes of said first and said further sensor are oriented parallel.

14. Method of making a sensor element for a sensor, comprising the steps of performing anisotropic wet chemical etching from the back side of a silicon wafer (10) to free and define a silicon mass (16) from a substrate layer (9),
using the epitaxial layer (8) as an etch-stop for the back side etching, and
performing isotropic or anisotropic etching from the front side of the silicon wafer (10) to free and define the silicon mass (16) and the bars (14, 15).

15. Method of making a sensor element for a sensor according to claim 8,
comprising the steps of
removing said epitaxial layer (8) in an etch-groove region using an isotropic etching process, preferably a trenching process;
etching through the silicon wafer (10) in said etch-groove region in a subsequent electro-chemical, anisotropic etching process from the front side of the wafer; and
under-etching the bars (14, 15) electrochemically, using the epitaxial layer (8) as an etch-stop.

16. Method according to claim 15, wherein
said epitaxial layer (8) is passivated using a passivating layer, in which an etch mask is created by photolithographic means, and the structure of said etch mask is provided with corner compensation for the convex corners of the sensor structure of the sensor element.

17. Method according to claim 14, comprising the steps of
providing a p-substrate (9) with a first p-doping (7) in a region from which a movable silicon mass (16) will be defined,
forming an n-epitaxial layer (8) on said substrate (9);
providing a portion of said layer (8) with a second -doping (6) in a region from which the movable mass (16) and supporting bars (14, 15) are to be defined, so that the first p-doping (7) and the second p-doping (6) interdigitate.

* * * * *